United States Patent
Kitamura

(10) Patent No.: US 9,257,822 B2
(45) Date of Patent: Feb. 9, 2016

(54) DISTRIBUTION STRUCTURE OF WIRE HARNESS

(75) Inventor: Kazuhiro Kitamura, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 0 days.

(21) Appl. No.: 13/362,086

(22) Filed: Jan. 31, 2012

(65) Prior Publication Data

US 2012/0261184 A1  Oct. 18, 2012

(30) Foreign Application Priority Data

Apr. 13, 2011 (JP) ................................. 2011-089523

(51) Int. Cl.
*H02G 3/06* (2006.01)
*B60R 16/02* (2006.01)
*H02G 3/04* (2006.01)
*H02G 3/32* (2006.01)

(52) U.S. Cl.
CPC .......... *H02G 3/0691* (2013.01); *B60R 16/0215* (2013.01); *H02G 3/0468* (2013.01); *H02G 3/32* (2013.01)

(58) Field of Classification Search
CPC ..... H02G 3/0691; H02G 3/0468; H02G 3/32; B60R 16/0215
USPC ........ 174/72 A, 72 R, 70 C, 68.1, 68.3, 88 R, 174/95, 650, 40 CC
See application file for complete search history.

(56) References Cited

U.S. PATENT DOCUMENTS

| | | | | |
|---|---|---|---|---|
| 4,248,459 A * | 2/1981 | Pate | ...................... | F16L 3/1236 174/665 |
| 5,315,062 A * | 5/1994 | Hoshino | .............. | H01R 13/506 174/72 C |
| 5,352,855 A * | 10/1994 | Potter | ........................... | 174/135 |
| 5,534,665 A * | 7/1996 | Long | ........................... | 174/72 A |
| 5,905,231 A * | 5/1999 | Houte | ................. | B60R 16/0215 138/165 |
| 6,211,465 B1 * | 4/2001 | Streit | ................... | H02G 3/0391 16/2.1 |
| 7,906,728 B2 * | 3/2011 | Sakata | ................ | B60R 16/0215 138/162 |
| 2002/0000499 A1 * | 1/2002 | Aoki | ................... | B60R 16/0215 248/74.4 |
| 2003/0183413 A1 * | 10/2003 | Kato | ........................ | H02G 3/32 174/135 |
| 2004/0154817 A1 * | 8/2004 | Sudo | ........................ | H02G 3/06 174/481 |
| 2006/0090920 A1 * | 5/2006 | Fujita | .................. | B60R 16/0207 174/72 A |
| 2007/0187144 A1 * | 8/2007 | Kato | .................... | H02G 3/0468 174/72 A |
| 2007/0278358 A1 * | 12/2007 | Clark | .................. | B60R 16/0215 248/74.1 |
| 2009/0050350 A1 * | 2/2009 | Katsumata | ........... | H02G 3/0691 174/135 |

(Continued)

FOREIGN PATENT DOCUMENTS

JP  9-219915  8/1997

*Primary Examiner* — Zachary M Pape
*Assistant Examiner* — Douglas Burtner
(74) *Attorney, Agent, or Firm* — Gerald E. Hespos; Michael J. Porco; Matthew T. Hespos

(57) ABSTRACT

A wire group of a branch line or a trunk line of a wire harness is covered with a corrugated tube in proximity to an external interfering material projecting from a vehicle body panel. A corrugated clamp is fit fixedly on an end side of the branch portion of the corrugated tube, an outer surface of a vehicle body locking box of the corrugated clamp is brought into abutment with the vehicle body panel having the external interfering material projecting therefrom, and the distance between an outer surface of the wire group covered with the corrugated clamp and the corrugated tube fitted thereon and the external interfering material is larger than the dimension of projection of the external interfering material from the vehicle body panel.

6 Claims, 4 Drawing Sheets

(56) References Cited

U.S. PATENT DOCUMENTS

| | | | | |
|---|---|---|---|---|
| 2009/0084578 A1* | 4/2009 | Irisawa | ............... | B60R 16/0215 174/135 |
| 2009/0166480 A1* | 7/2009 | Sakata | ................. | H02G 3/0691 248/71 |
| 2009/0211781 A1* | 8/2009 | Suzuki | ................. | H02G 3/0418 174/101 |
| 2009/0301758 A1* | 12/2009 | Suzuki | ................ | B60R 16/0215 174/135 |
| 2010/0230157 A1* | 9/2010 | Sakata | ................ | B60R 16/0215 174/72 A |
| 2015/0107894 A1* | 4/2015 | Hayashi | .............. | B60R 16/0215 174/72 A |

* cited by examiner

DISTRIBUTION STRUCTURE OF WIRE HARNESS

BACKGROUND OF THE INVENTION

1. Field of the Invention

The invention relates to a distribution structure of a wire harness to be distributed in an automotive vehicle and, more specifically, to achieve protection of the wire harness easily and reliably when there is an external interfering material in a route of distribution of the wire harness.

2. Description of the Related Art

A wire harness of an automotive vehicle is connected to electrical components mounted thereon and is distributed in the vehicle. However, an external interfering material, such as a squeezed-out projection of a vehicle body panel formed of metal, or spatter generated from a weld, may exist along the route of the wire harness. External interfering material formed of metal may contact a wire group of the wire harness and break an insulation covering of wire to contact a core wire and create a risk of a short circuit.

JP-A-9-219915 and FIG. 5 herein disclose a harness distribution structure on a vehicle body panel to avoid contact between an edge 100e of an operation hole 100H on a door panel 100 and a door harness 110. A clip 120 locks the door harness 110 to the door panel 100 and an embossment 130 between the clip 120 and the periphery of the operation hole 100H moves the door harness 110 away from the periphery of the operation hole 100H, so that a non-contact state is maintained.

JP-A-9-219915 requires work on the vehicle body panel to form the embossment. On the other hand, a protective measure often is taken on the side of the wire harness. For example, a wire harness may be covered with a protector or a corrugated resin tube, or may be half-lapped with an insulating resin tape to prevent interference with the external interfering material at a position passing the external interfering material for reliably eliminating the possibility of a short circuit.

However, a position where a branch line is branched from a trunk line of the wire harness cannot be protected by a continuous corrugated tube and hence the wire group is exposed at a branch of the wire harness. Therefore, when the external interfering material is located near a branch of the wire harness, protection is achieved by methods shown in FIGS. 6(A), 6(B) and 6(C). FIG. 6(A) shows a branch 100P of the wire harness wrapped by a vinyl sheet or a tube 150 formed of a thick flexible material. An adhesive tape 200 then is wound around the outer periphery of the sheet or tube 150 and is fixed to the wire harness. FIG. 6(B) shows the branch 100P inserted through a box-shaped rigid protector 160 that is molded from resin and the protector 160 is fixed to the wire harness with an adhesive tape. FIG. 6(C) shows the branch 100P protected by winding a thick adhesive vinyl tape 180 in a crossed manner into an X-shape by a number of turns.

The methods of FIGS. 6(A), 6(B) and 6(C) enable the branch of the wire harness to be protected by an outer sheath. However, the adhesive tape 200 must be wound in a manner shown in FIG. 6(A). In particular, when the thick adhesive vinyl tape 180 is wound in the crossed manner into an X-shape as shown in FIG. 6(C), the branch swathed in the thick adhesive vinyl tape 180 has a disfigured appearance. Hence, the methods described above cause trouble in work and impair the productivity of the wire harness. In addition, the finished branch portion is distorted, which impairs easy assembly of the wire harness. In addition, the appearance is not attractive.

In view of the problems described above, it is an object of the invention to achieve easy protection of the wire group from external interfering material near a branch where the wire group is exposed and cannot be covered by a corrugated tube or the like.

SUMMARY OF THE INVENTION

The invention provides a distribution structure of a wire harness at a location where a branch line is branched from a trunk line of the wire harness. A wire group of the branch line or the trunk line is covered with a corrugated tube in the proximity to an external interfering material that projects from a vehicle body panel. A corrugated clamp is fit fixedly on an end of the corrugated tube. The corrugated clamp has a vehicle body locking box that is brought into abutment with the vehicle body panel from which the external interfering material projects. A distance between an outer surface of the wire group covered with the corrugated clamp and the corrugated tube and the external interfering material exceeds the projecting dimension of the external interfering material from the vehicle body panel.

As described above, the invention does not require covering the branch portion of the wire harness with a vinyl sheet, a tube, a protector, a resin-molded hard protector or winding the adhesive tape twice thereon. Rather, the invention prevents the external interfering material from damaging the wire group by securing a gap the exposed wires and the external interfering material that is sufficiently large to prevent the portion of the wire group between the corrugated tube and the corrugated clamp from contacting the external interfering material.

As described above, the corrugated clamp is configured to fit on the corrugated tube to ensure the separation distance from the vehicle body panel having the external interfering material projecting therefrom. More particularly, the corrugated clamp is capable of securing a dimension of at least 10 mm from the outer surface of the corrugated tube covering the wire group to the vehicle body panel, and a larger dimension when the projecting amount of a vehicle body locking box of the corrugated clamp is large. Finally, the distance from the outer surface covered by the corrugated tube to the vehicle body panel may be set to a distance on the order of 60 to 100 mm.

This separation may be achieved by inserting a clamp mounting bracket to project from the vehicle body panel into and locked with the vehicle body locking box of the corrugated clamp, or by bringing an outer surface of the vehicle locking box of the corrugated clamp into abutment with the vehicle body panel.

The corrugated tube is a general-purpose extrusion, and includes ring-shaped crests and troughs alternating in the axial direction. The corrugated clamp to be fit on the corrugated tube also is a resin molded product. The corrugated clamp includes two semi-circular portions that can fit on the corrugated tube and that are connected to each other via a thin hinge. Inner peripheral surfaces of the semi-circular portions have recesses and projections that fit to the crests and troughs of the corrugated tube. The corrugate clamp includes a vehicle body locking box projecting from an outer surface of one end of one of the semi-circular portions. The vehicle body locking box has an insertion locking portion for receiving a locking strip at an end of the other semi-circular portion and an insertion locking portion for a bracket projecting from the vehicle body panel. A sum of the projecting thickness of the vehicle body locking box of the corrugated clamp, the thickness of the semi-circular portion of the corrugated clamp and the thickness of a peripheral wall of the corrugated tube exceeds the projecting distance of the external interfering material from the vehicle body panel to protect the outer surface of the wire group covered with the corrugated tube.

In this manner, protecting the branch portion of the wire harness from the external interfering material merely requires covering the wire group in proximity to the external interfering material with the corrugated tube and attaching the corrugated clamp on the corrugated tube. Attachment of the corrugated clamp to the corrugated tube can be performed by one-touch operation, and is achieved easily merely by putting the first and second semi-circular portions of the corrugated clamp on the corrugated tube and inserting the locking strip at the end of the second semi-circular portion into the vehicle body locking box at the end of the first semi-circular portion.

The corrugated tube and the corrugated clamp reliably space the wire group from the external interfering material in the proximity to the branch portion of the wire harness. Thus, the branch of the wire harness need not be protected by an outer sheath, such as the vinyl sheet or the tube used in the related art, or by the hard protector or the double winding of the adhesive tape. Therefore, when the branch of the wire harness is located at a position visible to passengers, it is preferable to cover the exposed wire group simply by winding the sheet or the like on the branch portion. However, when the branch is in the interior of an instrument panel at a position not visible to the passenger, it is not necessary to cover the branch by winding the sheet or the tape thereon.

As described above, it is not necessary to attach the outer sheath, the tube or the hard protector to the branch and fix the same with the adhesive tape, or to wind adhesive tape twice in a crossed manner to protect the branch of the wire harness from the external interfering material. Rather, it merely is necessary to attach the corrugated clamp to the corrugated tube that covers the wire harness. Thus, productivity of the wire harness can be enhanced. In addition, distortion due to winding the adhesive tape plurality times is avoided, and the finishing of the branch can be improved.

DETAILED DESCRIPTION OF THE PREFERRED EMBODIMENT

Figure 1:
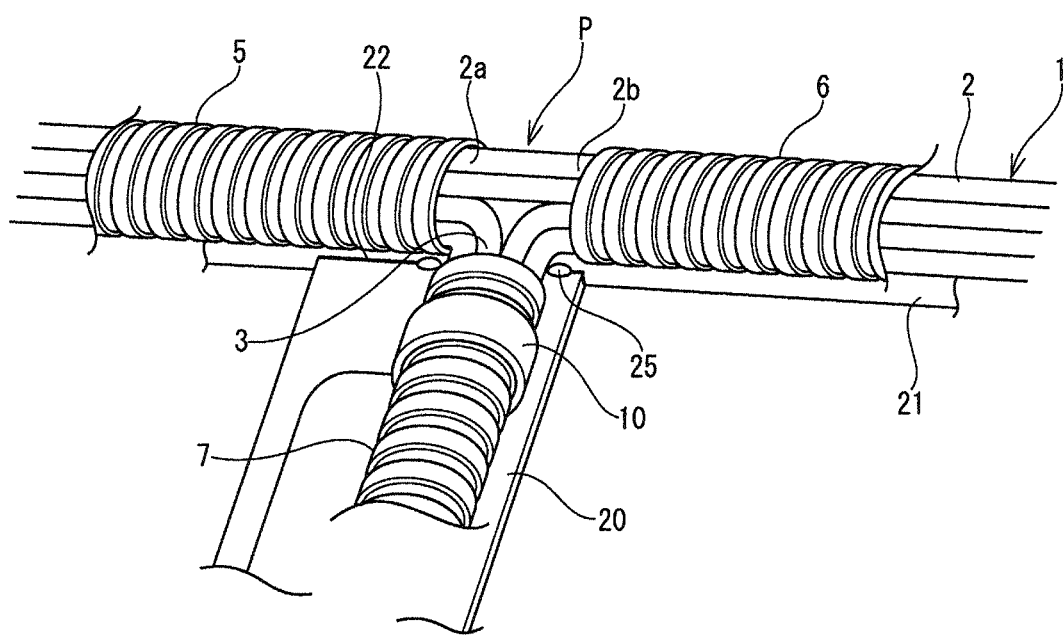
FIG. 1 is a perspective view showing an embodiment of the invention.
Figure 2A:
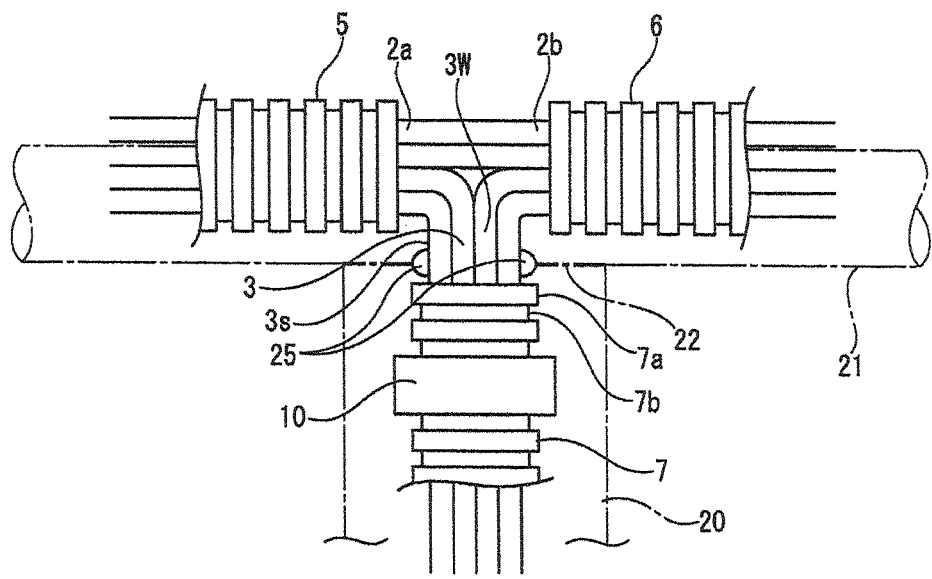
FIG. 2(A) is a plan view and FIG. 2(B) is a side view.

A wire harness 1 in accordance with the invention is distributed in an instrument panel of a vehicle, as shown in FIG. 1 and FIG. 2. An arc welding portion 22 between a panel or instrument stay 20 of the instrument panel of the vehicle and a metal pipe 21 is located downside of and in proximity to a branch position P of a T-shape where branch lines 3 are branched from a trunk line 2 of the wire harness 1. Squeezed-out projections of melted metal spatter at the arc welding portion 22 also are located as external interfering materials 25. The external interfering materials 25 are downside of the branch position P of the wire harness on the side where the branch lines 3 project.

Corrugated tubes 5 and 6 formed of molded resin are fit on both sides 2a and 2b of the trunk line 2 of the wire harness 1 across the branch position P, and a corrugated tube 7 is fit on the branch lines 3 as well. The corrugated tubes 5, 6 7 fit on the wire harness 1 cannot be fitted on the branch position P of the T-shape, the trunk line 2 and the branch lines 3 are exposed at the branch position P, and the external interfering materials 25 are located on the downside of the exposed branch lines 3. An outer sheath on the side of the trunk line 2 is not limited to the corrugated tubes 5 and 6.

A corrugated clamp 10 is attached to an end of the corrugated tube 7 fit on the branch lines 3 on the side of the branch position so as to avoid contact between a portion where a wire group 3W of the branch lines 3 is exposed and the external interfering materials 25, and a locking box 11 of the corrugated clamp 10 is pressed against the instrument stay 20.

The corrugated tube 7 is a general-purpose extrusion, and includes ring-shaped crests 7a and troughs 7b that alternative in the axial direction. The corrugated tubes 5 and 6 have the same configuration as the corrugated tube 7.

The corrugated clamp 10 to be fit on the corrugated tube 7 is molded of resin and includes first and second semi-circular portions 12 and 13 that are connected to each other via a thin hinge 14 at one end of each. Inner peripheral surfaces of the semi-circular portions 12 and 13 are provided with projections 12a and 13a to be fit to the troughs 7b of the corrugated tube 7. The locking box 11 projects from an outer surface of the end of the first semi-circular portion 12 opposite the hinge 14 and has an insertion lock 11a for a locking strip 15 at an end of the second semi-circular portion 13 and an insertion lock 11b for a bracket projecting from a vehicle body panel. Additionally, the locking box 11 has a first surface 11c and a second surface 11d, as shown in FIGS. 2(B) and 3.

Figure 2B:
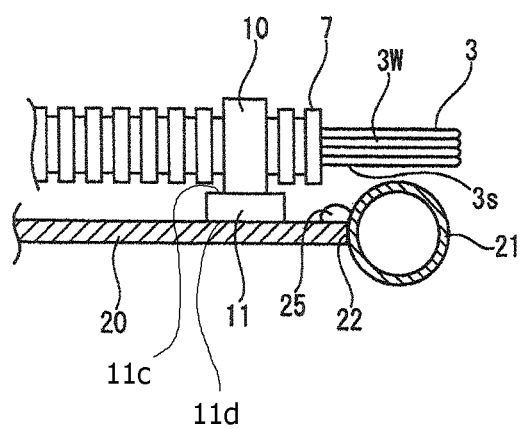
Figure 3:
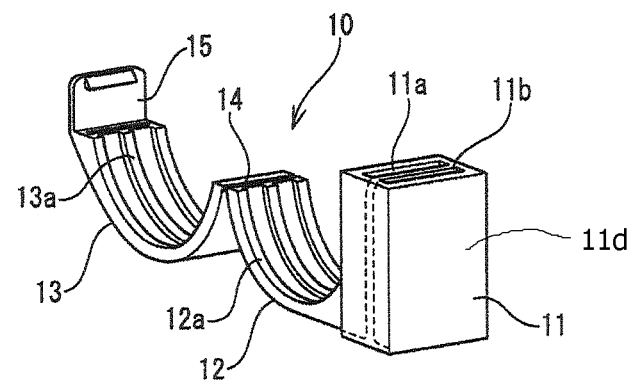
FIG. 3 is a perspective view of a corrugated clamp of the invention.
Figure 4:
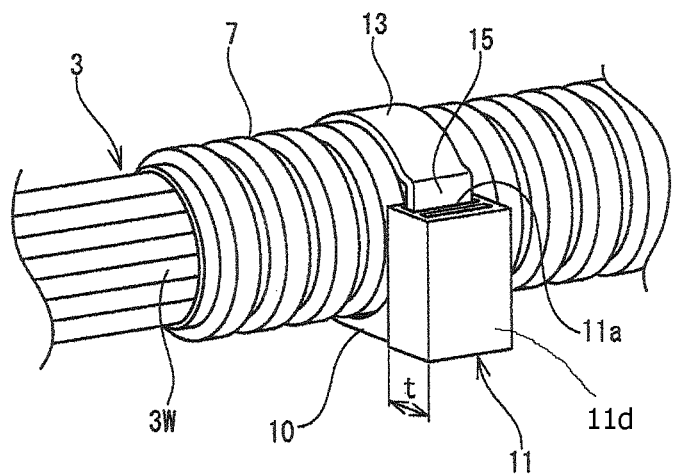
FIG. 4 is a perspective view showing a state in which the corrugated clamp is mounted on a corrugated tube covering branch lines.
Figure 5:
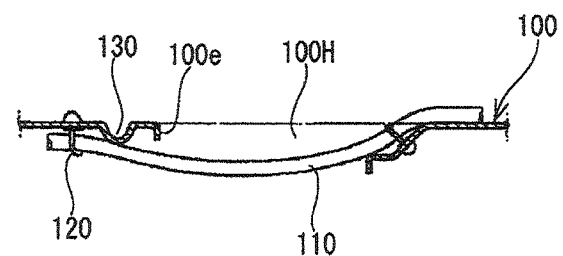
FIG. 5 is a drawing showing a related art.
Figure 6A:
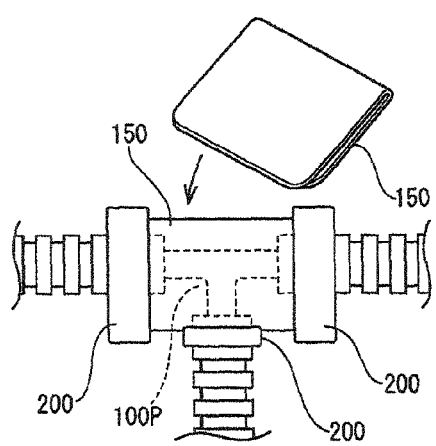
FIGS. 6(A), 6(B), and 6(C) are drawings showing another related art.
Figure 6B:
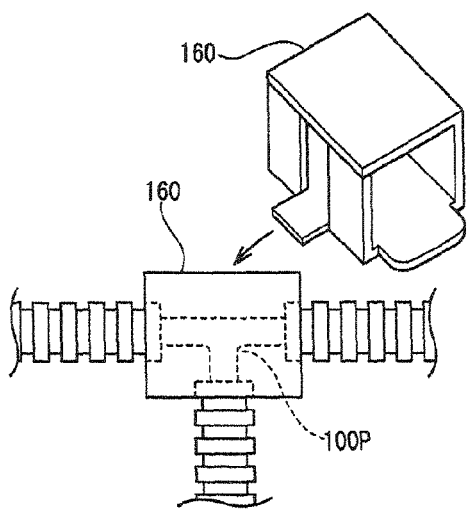
Figure 6C:
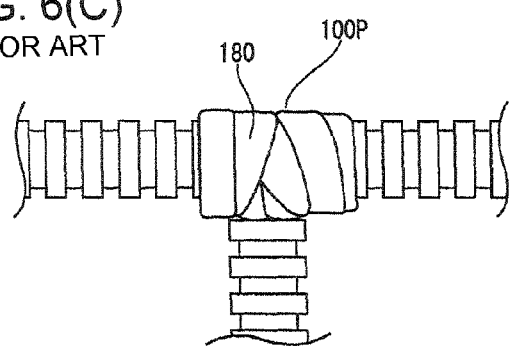

A projecting thickness of the locking box 11 of the corrugated clamp 10 from the first surface 11c to the second surface 11d is identified by the letter (t) in FIGS. 2B and 4. The projecting distance (t), the thickness of the semi-circular portion of the corrugated clamp 10, and also the thickness of the corrugated tube 7 are added to the thickness of an outer surface 3s of the wire group 3W of the branch lines 3, and the total thickness comes into contact with the instrument stay 20. The projecting thickness (t) of the corrugated clamp 10 in this embodiment is approximately 15 mm to 30 mm.

As described above, then the corrugated clamp 10 is fit on the end of the corrugated tube on the side of the branch position after the branch lines 3 of the wire harness 1 are covered with the corrugated tube 7. The locking strip 15 at the end of the second semi-circular portion 13 then is inserted into the locking box 11 of the first semi-circular portion 12, so that a lock coupling is achieved and the corrugated clamp 10 is fixed to the corrugated tube 7 in a one-touch operation.

In this manner, the corrugated tube 7 is fit on the branch lines 3 of the wire harness 1, and the corrugated clamp 10 is fit fixedly on the corrugated tube 7.

When distributing the wire harness 1 to a position in the interior of an instrument panel of the vehicle, an outer surface of the locking box 11 of the corrugated clamp 10 is brought into abutment with the instrument stay 20. The corrugated tubes 5 and 6 fit on the trunk line 2 of the wire harness 1 are fixed to the vehicle panel via a corrugated clamp (not shown), and hence the position of distribution of the wire harness 1 is fixed. As a result, the outer surface of the locking box 11 can be held in abutment with the instrument stay 20 even when the corrugated clamp 10 is not fixed to the instrument stay 20.

As described above, a space is provided by fixing the corrugated clamp 10 on the corrugated tube 7 that covers the branch lines 3, and pressing the locking box 11 that projects out of the corrugated clamp 10 against the instrument stay 20 that has the external interfering materials 25 projected therefrom. Accordingly, the wire group 3W exposing the branch lines 3 at the branch position P can be held at a distance from the external interfering materials 25.

Therefore, the wire group is located at a distance from the external interfering materials 25 and the distance is maintained reliably even if the wire group at the branch position P cannot be protected by the corrugated tube and hence is kept exposed. Therefore, it is not necessary to provide an outer sheath, such as a vinyl sheet or a tube on the branch position, or to attach a hard protector thereto, or to protect the wire group from the external interfering materials 25 with an adhesive resin tape wound in a crossed manner many times.

The wire harness in this embodiment is distributed in the interior of the instrument panel, and hence is at a position not visible to passengers. Thus, it is not necessary to wind the tape or the sheet on the branch portion to cover the exposed wire group to improve appearance. On the other hand, a branch portion of the wire harness that is at a position visible to passengers may be covered with the sheet or the tape. However, the covering is only for improved appearance and not for the protection of the wirings at the branch position. Therefore, it is not necessary to wind many times.

The invention is not limited to the above-described embodiment, and a configuration in which a bracket that projects from a vehicle panel is inserted into and locked with the corrugated clamp for securing the distance between the external interfering material and the wire to achieve fixation to the vehicle body panel is also applicable.

Furthermore, the invention may be applied to a case where squeezed-out projection or edges project from the vehicle body panel in the proximity of the branch position of the wire harness and hence become the external interfering material.

In addition, since the external interfering materials are located on the side of branch lines in the above-described embodiment, the corrugated clamp is fit on the corrugated tube that is to be fit on the branch lines. However, when the external interfering material is located on the side of the trunk line, the corrugated clamp is fixed on the end of the corrugated tube fit on the trunk line.

What is claimed is:

1. A distribution structure of a wire harness for a vehicle at a branch where a branch line is branched from a trunk line of the wire harness, comprising:

a corrugated tube covering a wire group of the branch line or the trunk line in proximity to an external interfering material projecting from a panel of the vehicle, the corrugated tube having a longitudinal axis extending parallel to the wire group; and a corrugated clamp having first and second semi-cylindrical portions connected to one another by a hinge, the first and second semi-cylindrical portions being fit fixedly around an end of the corrugated tube, the corrugated clamp including a vehicle body locking box on an end of the first semi-cylindrical portion opposite the hinge, the vehicle body locking box being disposed entirely on one longitudinal side of the corrugated tube and having a first surface substantially parallel to the longitudinal axis of the corrugated tube and facing toward the corrugated tube and a second surface opposite from an parallel to the first surface and facing away from the corrugated tube, the second surface of the locking box abutting with the panel of the vehicle in proximity to the external interfering material, the vehicle body locking box having opposite first and second ends extending between the first and second surfaces, the first end being in proximity to the end of the first semi-cylindrical portion opposite the hinge, the second end being formed with an insertion locking opening, a locking strip projecting from an end of the second semi-cylindrical portion opposite the hinge and a projecting distance of the locking strip from the end of the second semi-cylindrical portion being less than a distance between the ends of the vehicle body locking box, the locking strip being configured to lock in the insertion locking opening of the vehicle body locking box, wherein a distance between the first surface and the second surface of the vehicle body locking box is larger than a projecting distance of the external interfering material from the panel of the vehicle so that an outer surface of the wire group covered by the corrugated clamp is spaced from the external interfering material.

2. The distribution structure of a wire harness of claim 1, wherein a clamp mounting bracket projecting from the vehicle body panel is inserted into and locked with the vehicle body locking box of the corrugated clamp.

3. The distribution structure of a wire harness of claim 1, wherein the second surface of the vehicle body locking box of the corrugated clamp abuts the panel, but is not locked to the panel of the vehicle.

4. The distribution structure of a wire harness of claim 1, wherein the corrugated tube is formed of resin and has ring-shaped crests and troughs alternately arranged in an axial direction and the corrugated clamp is molded from resin.

5. The distribution structure of a wire harness of claim 1, wherein the second surface of the vehicle body locking box projects outward beyond an outer surface of the end of the first semi-cylindrical portion opposite the hinge.

6. The distribution structure of a wire harness of claim 1, wherein the vehicle body locking box further has a second insertion locking opening for engaging a bracket projecting from the panel of the vehicle.

* * * * *